Dec. 13, 1966 W. RICHTER ET AL 3,292,052

PROXIMITY SWITCHING SYSTEM

Filed Sept. 19, 1963

3,292,052

PROXIMITY SWITCHING SYSTEM

Walther Richter, River Hills, and James A. Gardner, Greenfield, Wis., assignors to Cutler-Hammer, Inc., Milwaukee, Wis., a corporation of Delaware Filed Sept. 19, 1963, Ser. No. 310,094
12 Claims. (Cl. 317—148.5)

This invention relates to proximity switching systems and more particularly to switching systems which respond to and detect and identify proximate approach or passage of metallic elements.

While not limited thereto, the invention is especially applicable to limit-detection or the like and for use as a limit switch to initiate a desired control function in response to predetermined approach or presence of a metallic member.

An object of the invention is to provide an improved proximity switching system.

A more specific object of the invention is to provide a simple and emonomical proximity switching system which is responsive to an amplitude of a sensor's input signal.

Another object of the invention is to provide an improved proximity switching system which is powered from a low frequency source such as a commercial power frequency source of 50 to 60 cycles or the like of alternating current.

Another object of the invention is to provide an improved proximity switching system which is responsive to proximate approach of a metallic element and which is readily adaptable to provide one of a plurality of different logic output control signals or to control a power switching relay.

Another object of the invention is to provide a proximity switching system of the type that responds to the amplitude of the sensor's input signal with means preventing operational response thereof to unwanted voltage transients or variations.

Other objects and advantages of the invention will hereinafter appear.

These and other objects and advantages of the invention and the manner of obtaining them will best be understood by reference to the following description of an embodiment of the invention taken in conjunction with the accompanying drawings, wherein.

Figure 1:
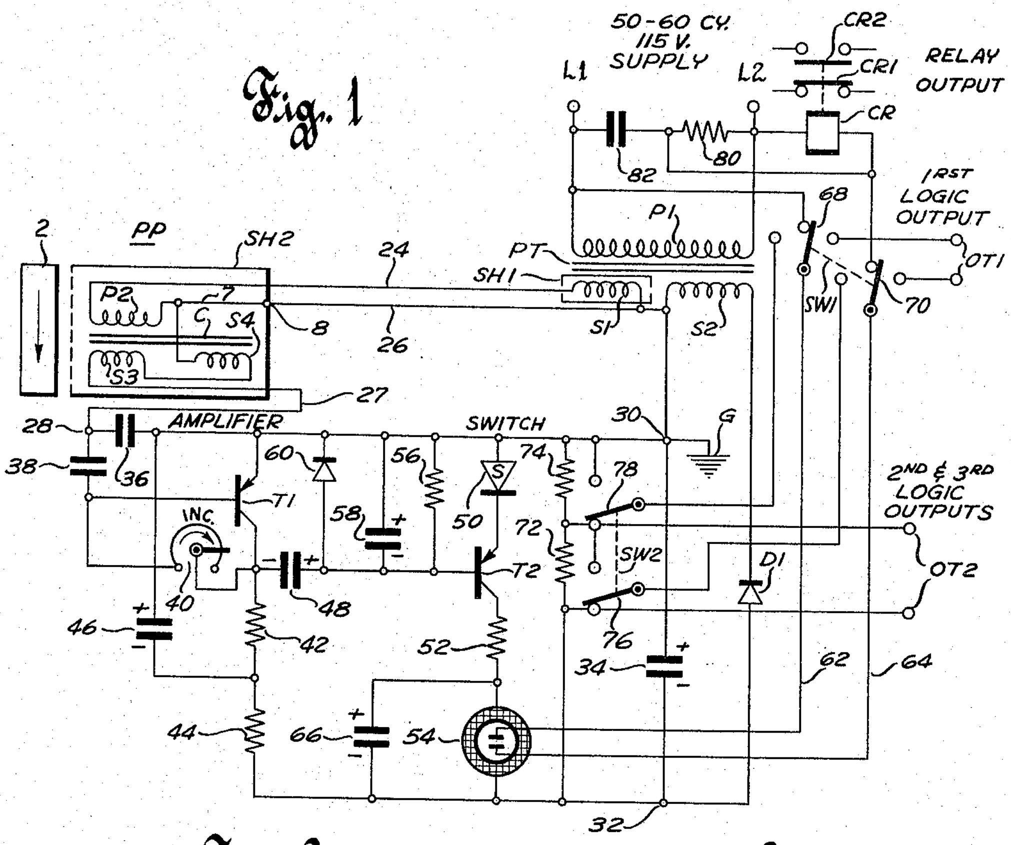
FIGURE 1 is a diagrammatic illustration of a proximity switching system constructed in accordance with the invention.

Referring to FIG. 1, there is shown a pair of commercial frequency power supply lines L1 and L2 for supplying operating power to the proximity switching system. Lines L1 and L2 are connected across the primary winding P1 of a power transformer PT having a pair of secondary windings S1 and S2. Winding S1 which is provided with a shield SH1 supplies power to the proximity probe PP whereas winding S2 provides supply voltage to the solid state amplifier and static switch of the system.

Figure 2:
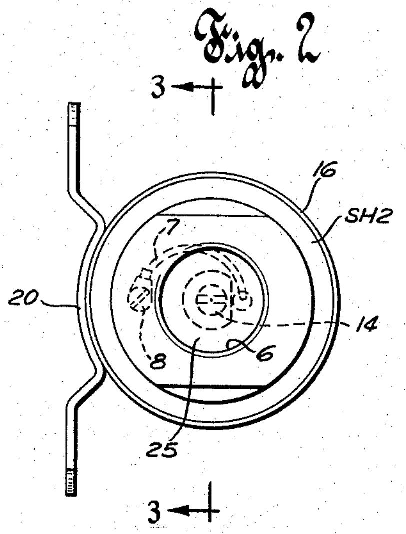
FIG. 2 is a rear elevational view of a proximity sensor probe employed in the system of FIG. 1.
Figure 3:
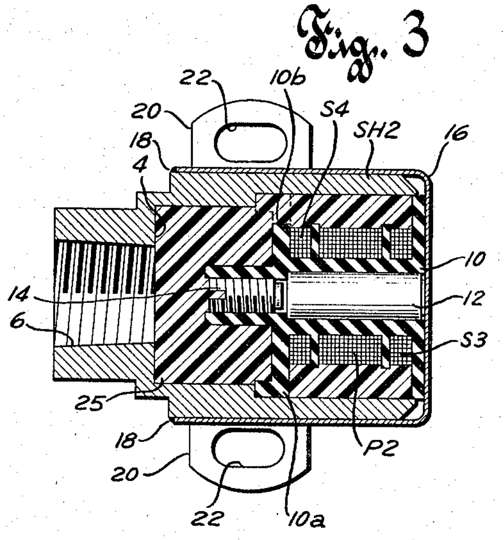
FIG. 3 is a cross-sectional view taken along line 3—3 of FIG. 2 showing the internal structure of the sensor probe.

Probe PP is provided with a balanced transformer having a primary winding P2, a pair of opposed secondary windings S3 and S4 electromagnetically coupled to the primary winding by a core C, and a ferromagnetic shield SH2 surrounding the windings and core except at the sensing end wherein a metallic element 2 is shown passing by. As shown in FIGS. 2 and 3, probe shield SH2 is a tubular frame of magnetic material such as steel which is open at the forward or sensing end. The reduced rear or tuning end portion of shield SH2 is provided with an inner, annular shoulder 4 and a coaxial threaded hole 6 for receiving a grounded electrical conduit. Shoulder 4 is provided with a small threaded hole wherein one conductor 7 of the probe coils is electrically connected by a screw 8 shown in FIG. 2 as more fully hereinafter described in connection with FIG. 1. A bobbin 10 having three axially spaced, external annular recesses and an axial bore is accommodated within the sensing end portion of shield SH2. Primary winding P2 is wound in the longer middle recess and secondary windings S3 and S4 are wound in the shorter forward and rearward recesses, respectively. A cylindrical core 12 of ferromagnetic material such as ferrite or the like is inserted in the bobbin bore so that one end thereof is substantially flush with the sensing end of the bobbin and is rigidly secured therein as by friction fitting, cementing or the like. A tuning slug 14 of magnetic material is threaded into a reduced rear end portion of the bobbin bore to afford fine adjustment thereof toward core 12 whereby to balance the secondary windings for equal magnetic opposition so that the coils provide minimum output voltage when the electromagnetic field at the sensing end is undisturbed. A cup-shaped cover 16 surrounds shield SH2 so that the sensing end of core 12 is adjacent the inner surface of the bottom of the cover. The edge of the cover is rigidly secured to and sealed to shield SH2 as by solder 18. Cover 16 is formed of relatively non-magnetic or low permeability material, such as stainless steel or the like, so that it does not impede the passage of the electromagnetic field therethrough whereas shield SH2 shields the internal windings and core from extraneous magnetic or electromagnetic fields. A mounting bracket 20 is rigidly secured at its midportion to cover 16. The opposite ends of bracket 20 extend laterally from the probe and are provided with oblong holes 22 for receiving screws or the like for mounting the probe to a supporting structure and to afford limited adpustment of the probe. The space around the coils and bobbin and the space between flange 10*a* of bobbin 10 and shoulder 4 of frame SH2 is completely filled with thermo setting material 25 such as epoxy to stabilize the coils and core within the frame. For this purpose, flange 10*a* of the bobbin is provided with a plurality of grooves 10*b* spaced therearound so that liquid epoxy poured through hole 6 will flow around the coils.

As shown in FIG. 1, secondary winding S1 of the power transformer is electrostatically shielded from primary winding P1 and secondary winding S2 by a shield SH1. Such shielding may be afforded by providing a thin copper sleeve between winding S1 and the other windings P1 and S2. This shield prevents secondary winding S1 from responding to transient voltages or unwanted disturbances occurring in primary winding P1.

As shown in FIG. 1, one end of secondary winding S1 is connected through a conductor 24 to one end of primary winding P2 in the probe. The other end of primary winding P2 is connected through conductor 7 to shield SH2 at a connector such as screw 8 hereinbefore described in connection with FIG. 2. The other end of secondary winding S1 is connected to one end of secondary winding S2 and to ground and is also connected through a shield conductor 26 to shield SH2. Secondary windings S4 and S3 are connected in series opposition and are connected at one side through a conductor 27 to input terminal 28 of the amplifier and are connected at the other side to conductor 7.

As will be apparent from the foregoing description, secondary windings S3 and S4 are connected in series opposition between input terminal 28 and ground G. Secondary winding S1 of the power transformer is connected across probe primary winding P2. Secondary winding S2 of the power transformer is connected across supply voltage terminals 30 and 32 in series with a half-wave rectifying diode D1. In these circuits, shield conductor 26 serves as a common connection whereby tto provide a minimum number of only three conductors between the system and the probe.

As aforementioned, secondary winding S2 of the power transformer affords supply voltage to the amplifier and the amplifying static switch circuit. To this end, grounded terminal 30 which is connected to one end of winding S2 is connected through a large capacity smoothing capacitor 34 to negative terminal 32 and the latter is connected through diode D1 in its forward, low impedance direction to the other end of winding S2. As a result, half-wave rectified and and smoothed supply voltage is applied across terminals 30 and 32.

A shunt capacitor 36 is connected across secondary or signal windings S3 and S4 of the probe, that is, between input terminal 28 and ground. This shunt capacitor shunts from the amplifier any high frequency or unwanted alternating current and has a low enough capacitance so that it has no significant effect on the low frequency input signal of 60 cycles or the like.

The signal amplifier comprises a coupling capacitor 38, a single stage amplifying device of the solid state type such as a P-N-P conductivity type transistor T1, a sensitivity adjusting rheostat 40, a pair of resistors 42 and 44 and a smoothing capacitor 46. Signal input terminal 28 is connected through coupling capacitor 38 to the base of transistor T1, the emitter is connected to ground G and the collector is connected through transistor load resistors 42 and 44 in series to negative voltage terminal 32. Smoothing capacitor 46 is connected across transistor T1 and resistor 42, that is, from ground to the junction between resistors 42 and 44. Resistors 42 and 44 and capacitor 46 having a large capacitance value similar to capacitor 34 perform a smoothing function for the supply voltage of transistor T1 in addition to that performed by capacitor 34. This capacitor 46 insures that the current flow through transistor T1 is constant in the absence of an input signal to avoid unwanted response of the static switch.

Transistor T1 always conducts. Bias current flows from ground at terminal 30 through the emitter and base, rheostat 40 and resistors 42 and 44 to negative terminal 32. This current maintains the transistor conducting so that current flows from ground at terminal 30 through its emitter and collector and resistors 42 and 44 to negative terminal 32. As a result, a constant unidirectional voltage appears at the collector of transistor T1 from which an output signal will be applied to the static switch device. Such output signal consists of a cyclical change in the amplitude of the collector current of transistor T1 when an alternating signal voltage is applied from proximity probe PP to amplifier input terminal 28.

Energization of primary winding P2 from lines L1 and L2 through primary winding P1 and secondary winding S1 of the power transformer excites core C, causing projection of an alternating electromagnetic field from the sensing end of the probe. Secondary windings S3 and S4 are provided with an equal number of turns wound in opposite directions so that the alternating voltages induced therein normally cancel one another. However, when element 2 passes through the electromagnetic field, it changes the electromagnetic coupling between primary winding P2 and secondary winding S3 to unbalance the probe secondary voltages and to apply an alternating signal voltage to input terminal 28 and through capacitor 38 to the base of transistor T1. The resulting current signal is amplified by transistor T1 whereby the collector current of the latter is proportionally changed in amplitude. This change in collector current amplitude operates the static switch as hereinafter described.

The sensitivity of the amplifier or the alternating current gain thereof may be adjusted at rheostat 40 which is connected between the base and collector of transistor T1. Sensitivity is increased by turning the movable tap clockwise as indicated by the arrow to increase the resistance in the bias circuit. It will be apparent that the input signal to the amplifier is applied across the emitter and base of transistor T1. Increasing the resistance of rheostat 40 decreases the base current of the transistor and thereby increases the sensitivity of the amplifier to the alternating input signal. Turning the rheostat counterclockwise to decrease the resistance in the bias circuit causes an increase in the base current and shunts the base-collector circuit thereby to decrease the sensitivity of the amplifier to the alternating input signal. The sensitivity of the amplifier may be adjusted so that the static switch device will respond when magnetizable material is sensed and will not respond when non-magnetic, conducting material is sensed.

The static switch circuit comprises a single stage, solid state switching device such as a P-N-P transistor T2 and control means therefor. A coupling capacitor 48 is connected between the output terminal of the first stage and the base of transistor T2. Ground potential is connected from terminal 30 through a low level voltage regulating device 50 to the emitter of transistor T2 and the collector is connected through a resistor 52 and the coil of a reed relay 54 in series to negative terminal 32. Such static switch circuit also comprises a resistor 56, a small capacitance value capacitor 58 and a unidirectional conducting device such as a diode 60 connected in parallel with one another between the base of transistor T2 and ground at terminal 30, diode 60 being poled to conduct in its forward, low impedance direction from the transistor base to ground.

Low level voltage regulatig device 50 may be a solid state device, such as a stabistor or the like and functions in the emitter circuit to reduce the leakage current in transistor T2. Any leakage current flowing in transistor T2 flows also through device 50 whereby the latter increases the emitter biasing voltage relative to the base to maintain transistor T2 nonconducting. Capacitor 58 shunts any extraneous voltages or transients from the base of transistor T2 to ground but the capacitance value thereof is so small that it will not have any significant effect on the 60 cycle input signal. Diode 60 permits capacitor 48 to discharge on positive going changes in the collector potential of transistor T1, but is ineffective on negatve going changes when capacitor 48 drives the base of transistor T2 negative, thus making transistor T2 conduct in response to an input signal.

When probe PP applies an alternating signal to input terminal 28, the positive half-cycles of such signal will render transistor T2 conducting whereas the negative half-cycles will have no significant effect thereon. Such positive half-cycle of signal voltage will be applied through coupling capacitor 38 to the base of transistor T1 to decrease the collector current of the latter. Such decrease in collector current will cause the collector voltage to increase negatively from its non-signal constant voltage value in proportion to and for the duration of the positive half-cycle applied to the base. This negative half-cycle voltage pulse is applied from the collector of transistor T1 through coupling capacitor 48 to the base of transistor T2. This causes turn-on current to flow from ground at terminal 30 through device 50 and the emitter to the base to render transistor T2 conducting. As a result, current flows from ground at terminal 30 through device 50, the emitter and collector, resistor 52 and the coil of reed relay 54 to negative terminal 32. Relay 54 closes its reed contacts to connect conductors 62 and 64 to one another whereby to provide one of the plurality of optional output controls. A capacitor 66 is connected across the coil of reed relay 54 to stretch the current pulse applied to the latter. When transistor T2 conducts, capacitor 66 charges. When transistor T2 stops conducting capacitor 66 discharges through the reed relay coil to maintain energization thereof during the negative half-cycle of the signal.

As aforementioned, the positive half-cycles of signal voltage applied from the probe to input terminal 28 decrease the collector current of transistor T1 to apply a negative pulse through coupling capacitor 48 to operate transistor T2 whereas the negative half-cycles of signal voltage have no effect on transistor T2.

As shown in FIG. 1, the system can be adapted to provide any desired one of a plurality of output controls. These optional output controls comprise an electromagnetic relay switching output and first, second and third logic function outputs.

The relay output may be used for switching power connections or the like and consists of energization of a control relay coil CR from power supply lines L1 and L2. This relay may be provided with desired normally closed and normally open contacts represented by contacts CR1 and CR2, respectively, which may be connected to open and close power circuits of controllable devices.

The first logic output may be used for low voltage control applications and consists of switching from an open circuit between two output terminals OT1 to a closed circuit therebetween. The second logic output may be used where switching is required from some intermediate voltage value to zero voltage. The third logic output may be used where switching is required from such intermediate voltage value to a higher voltage value.

For the aforementioned purposes, conductors 62 and 64, which are connected to the normally open reed contacts, are connected to the movable contacts of levels 68 and 70 of a double-pole or two-level three position selector switch SW1. As indicated by the broken line, the movable contacts of the switch levels are mechanically connected for operation in unison. Power supply line L1 is connected to a first stationary contact of level 68 and power supply line L2 is connected through relay coil CR to the corresponding stationary contact of level 70. Second stationary contacts of switch levels 68 and 70 are connected to output terminals OT1. Third stationary contacts of switch levels 68 and 70 are connected to the movable contacts of a double pole or two-level two-position selector switch SW2. A pair of resistors 74 and 72 are connected in series from ground at terminal 30 to negative terminal 32. First stationary contacts of levels 76 and 78 of selector switch SW2 are connected to the opposite ends of resistor 72 and the second stationary contacts thereof are connected to the opposite ends of resistor 74. The opposite ends of resistor 72 are connected to output terminals OT2.

When selector switch SW1 is set for the electromagnetic relay switching output as shown in FIG. 1, closure of the contact of reed relay 54 connects control relay coil CR across lines L1 and L2 to energize the control relay and to operate its power switching contacts. A resistor 80 of high resistance value is connected across control relay coil CR. This shunt resistor 80 makes the control relay coil less inductive since it permits shunt current flow in response to the self-induced voltage and thereby decreases any voltage feedback from the control relay coil into the primary winding of power transformer PT. It will be apparent that such voltage disturbance, if allowed to be fed back, might operate transistor T2. A capacitor 82 is connected across the contacts of reed relay 54 to suppress electrical arcing on the reed contacts when they close and open. Such contact arcing, if allowed to occur, might be fed back into the probe to cause unwanted operation of transistor T2. The aforementioned connections result in series connection of resistor 80 and capacitor 82 across lines L1 and L2 but capacitor 82 is provided with a small enough capacitance value so that it has no significant effect on the 60 cycle power applied to the primary winding of transformer PT.

When selector switch SW1 is turned clockwise to the right-hand stationary contacts, the contacts of reed switch 54 become connected across output terminals OT1. Thus, reed relay 54 switches output terminals OT1 from a circuit open to a circuit closed condition to provide a first optional logic output control.

To provide a second optional logic output control, selector switch SW1 is turned all the way counterclockwise to the left-hand stationary contacts and selector switch SW2 is left in the position shown in FIG. 1. As a result, the contacts of reed relay 54 become connected through switches SW1 and SW2 across resistor 72 also across output terminals OT2 since the latter are permanently connected to the opposite ends of resistor 72. Current flows from ground at terminal 30 through resistors 74 and 72 in series to negative terminal 32. When the reed contacts are open, a voltage equal to the potential drop across resistor 72 is applied to output terminals OT2. When the reed contacts close, the voltage across output terminals OT2 is reduced to zero value.

To provide the third optional logic output control, selector switch SW2 is turned clockwise to the other stationary contacts. This connects the reed contacts across resistor 74. When the reed contacts are open, a voltage equal to the potential drop across resistor 72 is applied to output terminals OT2. When the reed contacts close, resistor 74 is shunted. As a result, a larger current flows through resistor 72 to increase the voltage across output terminals OT2. Thus, the output voltage is switched from a first value to a higher value dependent upon the relative resistance values of resistors 72 and 74.

While selector switches SW1 and SW2 have been shown in FIG. 1 to illustrate how the different optional connections can be made to obtain the different output control functions, it will be apparent that in actual practice these selector switches need not be used at all. Instead, each proximity switching system may be permanently adapted to provide the desired output control function. It will be apparent that such adaptation can be made with a minimum of modification of the system.

While the invention hereinbefore described is effectively adapted to fulfill the objects stated, it is to be understood that we do not intend to confine our invention to the particular preferred embodiment of proximity switching device disclosed, inasmuch as it is susceptible of various modifications without departing from the scope of the appended claims.

We claim:

1. A proximity switching system for detecting the presence of metallic material comprising:
- a proximity detector comprising an exciting coil and two pickup coils in inductive relation to said exciting coil, said pickup coils being series connected and wound in phase opposition;
- means applying a commercial power, low frequency alternating current to said exciting coil to produce an electromagnetic field adjacent the detector;
- an amplifier for receiving an alternating voltage signal from said pickup coils when said electromagnetic field is disturbed by a metallic element thereby to provide a control signal;
- a static switching device;
- means providing supply voltage to said amplifier and to said static switching device from said alternating current applying means;
- means responsive to the magnitude of said control signal from said amplifier for operating said static switching device;
- an an electroresponsive reed relay responsive to operation of said static switching device for performing an output control function.

2. A proximity switching system for detecting the presence of metallic material and for performing an output control function in response thereto comprising:
- a proximity probe comprising a ferromagnetic core and an exciting coil and two pickup coils around said core, said exciting coil being between said pickup coils and one of said pickup coils being contiguous to the sensing end of the probe; and said pickup coils being connected in series opposition to provide minimum output signal when said exciting coil is energized;

a ferromagnetic frame around said coils to shield the latter from extraneous magnetic or electromagnetic fields except at the sensing end of the probe;

a cup-shaped non-magnetic enclosure covering said frame and the sensing end of the probe;

a commercial power, low frequency alternating current source and power translating means;

an alternating current amplifier;

a static switching circuit operable by the magnitude of the amplifier output signal;

means connecting supply voltage to said amplifier and to said static switching circuit from said power translating means;

and conductors connecting said probe coils to said power translating means and to said amplifier.

3. The invention defined in claim 2, wherein said power translating means comprises:

a power transformer having a primary winding supplied from said source;

a secondary winding for energizing said probe exciting coil;

another secondary winding providing supply voltage to said amplifier and to said static switching circuit;

and means electrostatically shielding the first mentioned secondary winding from the primary winding and the other secondary winding.

4. A proximity switching system for detecting the presence of metallic material and for performing an output control function in response thereto comprising:

a proximity sensor comprising a ferromagnetic core and an exciting coil and two pickup coils around said core, one of said pickup coils being contiguous to the sensing end of said sensor and said pickup coils being connected in series opposition to provide minimum output signal when said exciting coil is energized;

a commercial power, low frequency alternating current source and a power transformer;

a two stage, solid state amplifier;

an electroresponsive reed switch operable by said solid state amplifier;

rectifying means connecting supply voltage to said amplifier and said reed switch from said transformer;

and conductors connecting said exciting coil to said transformer and said pickup coils to said amplifier.

5. The invention defined in claim 4, wherein:

one of said conductors connects said exciting winding to said transformer;

a second conductor connects one of said pickup coils to said amplifier;

and a third conductor connects said exciting coil to said source and also connects the other pickup coil to said amplifier.

6. The invention defined in claim 4, wherein said electroresponsive reed switch comprises:

an operating coil connected for energization by said solid state amplifier;

and a pair of normally open reed contacts closable in response to energization of said operating coil.

7. The invention defined inclaim 6, together with:

a plurality of optional output control function devices any one of which may be adapted for control by said reed contacts and comprising:

a power switching, electromagnetic relay having an operating coil and contact means;

and means connecting said operating coil in circuit with said reed contacts across said source.

8. The invention defined in claim 7, together with:

a resistor connected across said relay operating coil for minimizing feedback of voltage disturbances through said transformer into said sensor exciting coil when said relay operating coil is energized or deenergized.

9. The invention defined in claim 7, together with:

a capacitor connected across said reed contacts for suppressing arcing upon closure or opening thereof and thereby to reduce feedback of voltage disturbances therefrom through said transformer into said sensor exciting coil.

10. The invention defined in claim 7, wherein said plurality of optional output control function devices also comprises:

a pair of output terminals connected across said reed contacts for providing a logic output consisting of switching from an open circuit condition to a closed circuit condition when said reed contacts close.

11. The invention defined in claim 7, wherein said plurality of optional output control function devices also comprises:

resistor means connected across said rectified supply voltage;

a pair of output terminals connected across a portion of said resistor means;

and means connecting said reed contacts for shunting said resistor portion to provide a logic output consisting of switching from a predetermined direct voltage to no voltage when said reed contacts close.

12. The invention defined in claim 7, wherein said plurality of optional output control function devices further comprises:

resistor means connected across said rectified supply voltage;

a pair of output terminals connected across a portion of said resistor means;

and means connecting said reed contacts for shunting another portion of said resistor means to provide a logic output consisting of switching from a first value of direct voltage to a higher value of direct voltage when said reed contacts close.

References Cited by the Examiner

UNITED STATES PATENTS

| | | | |
|---|---|---|---|
| 3,071,699 | 1/1963 | Eckl et al. | |
| 3,197,658 | 7/1965 | Byrnes et al. | 307—116 |
| 3,207,917 | 9/1965 | Martin | 317—148.5 X |

MILTON O. HIRSHFIELD, *Primary Examiner.*

MAX L. LEVY, SAMUEL BERNSTEIN, *Examiners.*

L. T. HIX, *Assistant Examiner.*